United States Patent

Flinck et al.

[11] Patent Number: 5,841,774
[45] Date of Patent: Nov. 24, 1998

[54] METHOD AND SYSTEM FOR CONTROLLING STATISTICALLY MULTIPLEXED ATM BUS

[75] Inventors: Hannu Flinck, Helsinki; Osmo Kaukanen, Hyvinkää; Timo Ylönen, Espoo; Juha Seppänen, Helsinki, all of Finland

[73] Assignee: Nokia Telecommunication Oy, Espoo, Finland

[21] Appl. No.: 676,202
[22] PCT Filed: Jan. 13, 1995
[86] PCT No.: PCT/FI95/00012
§ 371 Date: Jul. 16, 1996
§ 102(e) Date: Jul. 16, 1996
[87] PCT Pub. No.: WO95/19674
PCT Pub. Date: Jul. 20, 1995

[30] Foreign Application Priority Data

Jan. 17, 1994 [FI] Finland .................................. 940220

[51] Int. Cl.⁶ ........................................................ H04J 3/24
[52] U.S. Cl. ............................ 370/399; 370/410; 370/438
[58] Field of Search .................................. 370/395, 400, 370/410, 401, 402, 403, 423, 438, 426, 439, 440, 451, 455, 461, 462, 398, 399; 395/200.01, 250, 280, 287, 288, 306, 307, 308, 427, 481, 485, 821, 842, 847, 848, 856, 860, 200.74, 200.83; 364/239, 240, 240.2, 240.5, 242.6, 242.92, 240.3, 204.7, 937.01

[56] References Cited

U.S. PATENT DOCUMENTS

| | | | |
|---|---|---|---|
| 4,811,306 | 3/1989 | Boning et al. | 365/200 |
| 4,896,256 | 1/1990 | Roberts | 395/309 |
| 5,237,567 | 8/1993 | Nay et al. | 370/438 |
| 5,388,229 | 2/1995 | Hyouga et al. | 395/310 |
| 5,402,421 | 3/1995 | Tal | 370/439 |
| 5,432,782 | 7/1995 | Suzuki | 370/419 |
| 5,446,738 | 8/1995 | Kim et al. | 370/395 |

FOREIGN PATENT DOCUMENTS

| | | |
|---|---|---|
| 0 022 170 | 1/1981 | European Pat. Off. . |
| 0 354 119 | 2/1990 | European Pat. Off. . |
| 0 425 731 | 5/1991 | European Pat. Off. . |
| 0 493 233 | 7/1992 | European Pat. Off. . |
| 0 506 134 | 9/1992 | European Pat. Off. . |
| 0 526 990 | 2/1993 | European Pat. Off. . |
| 0 576 855 | 1/1994 | European Pat. Off. . |
| 91/07031 | 5/1991 | WIPO . |

*Primary Examiner*—Chi H. Pham
*Assistant Examiner*—Kwang B. Yao
*Attorney, Agent, or Firm*—Pillsbury Madison & Sutro, LLP

[57] ABSTRACT

A method and system for controlling a statistically multiplexed ATM bus, to the bus being connected a bus controller and interface units for transmission of packets, i.e. cells, over the bus, in which, having detected, for each cell to be transmitted to an ATM bus, the address of the interface unit participating in the transmission, the bus controller sets the address on an address bus of the ATM bus, thereby activating transmission of the cell from the bus controller to the interface unit, or vice versa, over a data bus of the ATM bus. During the transmission of the cell, the bus controller fetches the next interface unit address for transmission of the next cell from or to the interface unit concerned.

11 Claims, 1 Drawing Sheet

METHOD AND SYSTEM FOR CONTROLLING STATISTICALLY MULTIPLEXED ATM BUS

This application claims benefit of international application PCT/FI95/0012 filed Jan. 13, 1995.

BACKGROUND OF THE INVENTION

The invention relates to a method and system for controlling a statistically multiplexed ATM bus, to the bus being connected a bus controller and interface units for transmission of packets, i.e. cells, over the bus. The invention thus relates to a bus solution applicable to statistical multiplexing and demultiplexing of ATM cells from several interface cards. The interface rates are typically between 0 and 155 Mbit/s.

In an ATM (Asynchronous Transfer Mode), data is transmitted in packets, i.e. cells, of 53 octets. One basic ATM rate at which these cells are transmitted and switched is 155 Mbit/s. When interfaces with a lower transmission rate are connected to an ATM switch that switches 155 Mbit/s cell streams, the ATM cells generated by the interfaces must be multiplexed to this rate. Correspondingly, it must be possible to demultiplex a 155 Mbit/s cell stream to a lower rate.

Previously used bus solutions, such as the SDH multiplexers of product family SYNFONET and the PCM buses of Nokia DX200, are based on time-shared operation of the bus, in which each interface is allocated a separate time slot. This is a waste of bus capacity and is not suitable to statistical multiplexing since bus capacity is assigned irrespective of transmission need. Because of this, concentration, i.e. serving of interfaces having a greater than nominal cell transmission rate, is impossible.

SUMMARY OF THE INVENTION

The object of the present invention is to provide a method and system by which the above restrictions can be eliminated. The method of the invention is characterized in that after detecting, for each cell to be transmitted to an ATM bus, the address of the interface unit participating in the transmission, the bus controller sets the address on an address bus of the ATM bus, thereby activating the transmission of the cell from the bus controller to the interface unit, or vice versa, over a data bus of the ATM bus; and that during the transmission of the cell, the bus controller fetches the next interface unit address for transmission of the next cell from or to the interface unit concerned.

The bus allocation in accordance with the invention enables the use of transmission capacity by only those interfaces that have an actual transmission need. The allocation method allows prioritization of interfaces and makes concentration possible by furnishing the bus with interface units having a transmission capacity of above e.g. 155 Mbit/s.

Transmission capacity of a bus controlled as described herein is thus useful in both uplink and downlink directions such that in both directions e.g., a single unit can take the whole transmission capacity if the other units do not have anything to transmit.

BRIEF DESCRIPTION OF THE DRAWINGS

In the following, the invention will be described by means of an example with reference to the attached drawing, wherein.

DETAILED DESCRIPTION

Figure 1:
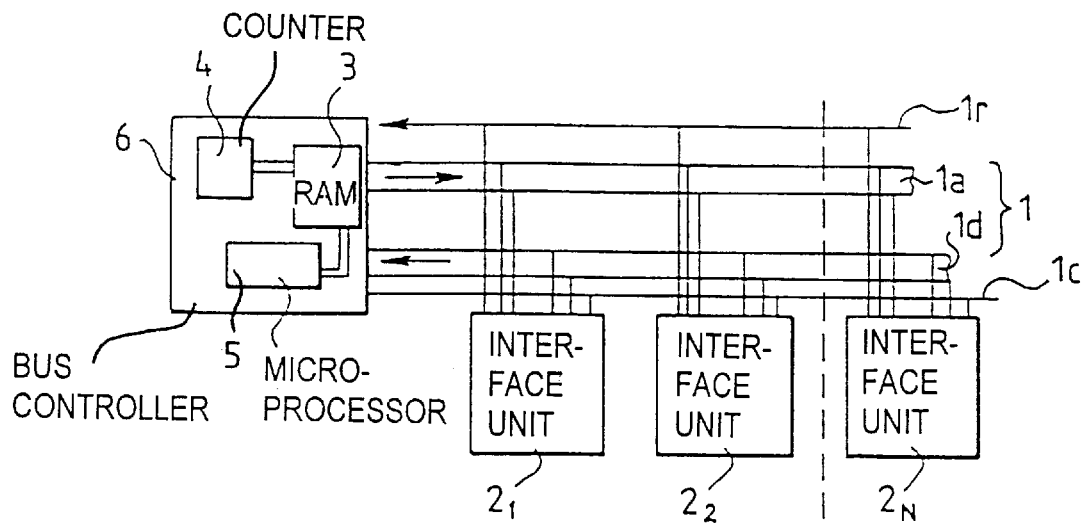
FIG. 1 illustrates the principle of the invention in the multiplexing direction.

The principle of the system shown in FIG. 1 and operating in accordance with the invention is the following.

The ATM bus of the invention is a 'point-to-multipoint' type bus with a transmission capacity of e.g., about 155 Mbit/s. Data is transmitted in cells of 53 octets. The start of a cell is indicated by a cell sync pulse, which occurs at 2.72 $\mu$s intervals. The bus divides into a multiplexing ('uplink') element and a demultiplexing ('downlink') element, the multiplexing element being shown in FIG. 1 and the demultiplexing element being shown in FIG. 2. A multiplexing element 1 of the bus has its own data bus 1$d$ and address bus 1$a$.

Part 1$c$ of the bus is for timing on the cell and bit level. The operation of the bus is controlled by a bus controller 6, multiplexer, provided with a microprocessor 5 and connected to an ATM switch by a 155 Mbit/s line. The bus further includes a request trace 1$r$. Each of the data bus, address bus, control bus and request trace, as shown, is provided by physically separate wires or traces. To the bus is also connected a number of interface units $2_1$–$2_N$, which generate and/or receive ATM cells in accordance with their own transmission need and rate.

In the multiplexing direction, the bus controller 6 allocates transmission periods to the interface units $2^1$–$2_N$ by setting interface unit addresses from a RAM 3 of the controller on the address bus 1$a$. The controller scan the entire address space within the duration of one cell, which in this example (155 Mbit/s bus) is the above-mentioned 2.72 $\mu$s.

An interface unit $2_X$, i.e. any one of units $2^1$–$2_N$, that has an ATM cell to transmit, sends a request-to-send signal 1$r$ to the bus controller 6, which stops a counter 4 that increments addresses in the RAM 3 at the corresponding memory location X, maintaining the address of the interface unit $2_X$ that sent the request-to-send signal on the address bus 1$a$. The interface unit that requested transmission receives permission to transmit its cell at the rising edge of the next cell sync pulse (bus signal 1$c$). The bus controller simultaneously continues the interrupted incrementing of addresses at the next memory location X+1. Those interface units which do not have anything to transmit do not react in any way to the contents of the address bus in the multiplexing direction. The next possible transmitter is looked for simultaneously as the cell of the interface unit $2^X$ that has been authorized to transmit is being transmitted.

In the multiplexing direction, the interface units thus continuously 'listen' to the address bus 1$a$, but only an interface unit $2^X$ with a cell ready for transmission sends a request-to-send signal to the bus controller 6 when it detects its own address on the address bus.

By suitably initializing interface unit addresses in the memory locations of the RAM 3, different interface units $2_1$–$2_N$ can advantageously be given a different position in the allocation of the bus 1. If addresses of interface units are initialized in the memory in proportion to their transmission capacity, bus capacity can be allocated in a congestion in proportion to the transmission rate of the interface, i.e. the number of memory locations per interface unit in the memory of the bus controller is in proportion to the rate of each interface unit. For example, an 8 Mbit/s interface thus has 4 times as many addresses as a 2 Mbit/s interface.

It is also possible to assign more addresses to desired interface units than they are actually entitled to in view of their transmission rate, whereby interfaces are prioritized, i.e. the number of memory locations per interface unit in the memory of the bus controller is in proportion to the priority level of the interface unit.

Here, addresses of interface units stored in the memory 3 and located on the address bus may mean either addresses in a tabular memory or addresses stored in memory locations according to a rule. In the first case, the address is in a register that is scanned address-by-address, one address at a time; in the second case, the address is fetched from a memory location. Even in the latter case, one memory location is scanned at a time, but not necessarily in the physical order; addresses can thus be prioritized without repeating the same addresses, e.g. by means of prioritization tests varying with the situation.

The bus control according to the invention allows concentration of interface units, whereby the bus controller serves a larger number of interface units than the transmission capacity of the bus would allow if the interface units were used at full capacity.

Figure 2:
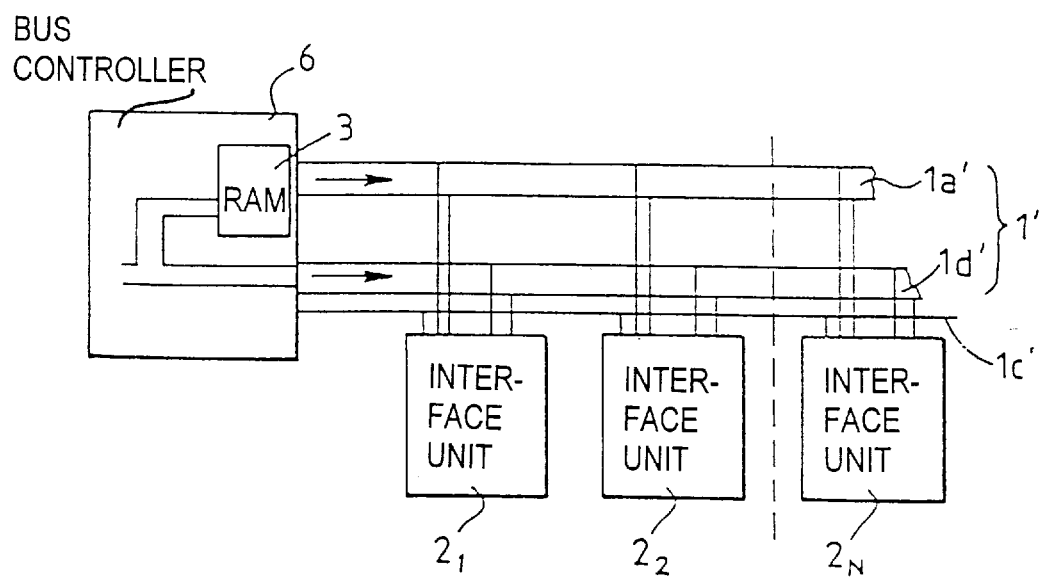
FIG. 2 illustrates the principle of the invention in the demultiplexing direction.

In the demultiplexing direction, as shown in FIG. 2, the bus controller 6 selects the address of the ATM cell to be transmitted to the receiver $2_1$–$2_N$ on the basis of the cell header, the whole or part of the contents of the VPI/VCI field in the cell being used for indicating the memory location of the memory 3 where the bus address of the desired interface unit is located. The address thus obtained is taken to the address bus $1a'$ of the demultiplexing bus 1', and the original cell is taken to the data bus $1d'$, The multiplexing (FIG. 1) and demultiplexing transmission directions thus have their own address and data buses.

The width and detailed timing of the bus (address and data buses $1a$, $1d$; $1a'$, $1d'$) on the technology available. The bus may either operate as a backplane bus for one multiplexer, or it may extend from one multiplexer to another. When a twisted twin cable is used for extending the bus from one multiplexer to another, the clock of the bus should be less than 20 MHz (e.g. 19.4 MHz), which leads to 8-bit wide data buses. The width of the address bus depends on the number of units to be multiplexed, but the address space of the bus controller, the memory access rate, and the cell transmission frequency of the bus must be proportioned to one another so that the entire address space can be scanned between two cell sync pulses, i.e. in this example in less than 2.72 $\mu$s, by conducting a poll that covers the addresses of the interface units.

It is obvious to one skilled in the art that the different embodiments of the invention are not limited by the above-described example but that they may vary within the scope of the attached claims.

We claim:

1. A method for controlling a statistically multiplexed ATM bus in a system having a bus controller and a plurality of interface units having respective addresses, the interface units being connected to the bus controller by the bus, the bus controller including a memory for storing said addresses, and the bus including four separate functional parts each constituted by respectively physically separate wires or leads, including a control bus arranged for transmitting cell synchronization signals and bit synchronization signals from the bus controller to the interface units, an address bus for arranged identifying individual ones of said interface units at respective succeeding times, by writing respective addresses for said individual units from said memory onto said bus, a data bus arranged for transmitting ATM cells from the respective said interface units, one unit at a time, to said bus controller, by respective transmissions which are synchronized by said cell synchronization signals, which indicate the start of each new cell on said bus and for reception of ATM cells by respective ones of said interface units, and a request-to-send lead arranged for transmitting a respective a request-to-send message from each said interface unit, to said bus controller, said method comprising the steps of:
(a) maintaining said addresses in said memory in a predetermined order;
(b) writing said addresses from said memory onto said address bus in said predetermined order;
(c) each said interface unit, when having at least one ATM cell to be transmitted, upon detecting its own address from said address bus as a result of step (b) being conducted, transmitting a respective request-to-send signal on said request-to-send lead, to said bus controller;
(d) said bus controller detecting each said request-to-send signal, from said request-to-send lead, and, in response to receiving each said request-to-send signal, temporarily maintaining the respective said address on said address bus;
(e) said bus controller transmitting said synchronization signals on said control bus, each occurrence of temporarily maintaining of step (d) being ended by detection of rising edge of a respective next one of said synchronization signals by said bus controller;
(f) each said interface unit, in response to receiving a rising edge of a respective next cell synchronization signal on said control bus while its respective said address is being maintained on said address bus as a consequence of step (d) being conducted, transmitting the respective said at least one ATM cell on said data bus; and
(g) each time step (f) is being conducted, said bus controller conducting step (b) in respect to a respective next address in said predetermined order.

2. The method of claim 1, further comprising:
(h) for transmitting multiplexed ATM cells having respective address fields, from said bus controller to respective ones of said interface units, said bus controller reading identifiers of respective ones of said interface units from respective ones of said address fields; and
(i) both placing each of said identifiers in succession on said address bus and placing each respective cell being transmitted thereby in respective succession on said data bus; and
(j) as a consequence of step (I) being conducted, each of said interface units receiving only respective ones of said ATM cells transmitted by said bus controller.

3. The method of claim 1, wherein:
as a result of conducting step (e) synchronization signals being transmitted on said control bus as a succession of pulses having respective intervals between them; and further including:
proportioning address space of said memory, access rate to said memory and cell transmission frequency on said data bus, so as to cause said bus controller to write successive ones of said addresses onto said address bus in step (b) in respective successive ones of said intervals.

4. The method of claim 1, wherein:
said interface units, among them, have at least two different ATM cell transmitting rates; and as part of conducting step (a), said memory is provided with a respective number of memory locations for each of said interface units which is proportionate to the respective ones of said rates.

5. The method of claim 1, wherein:

said interface units, among them, have at least two different priority levels; and as part of conducting step (a) said memory is provided with a respective number of memory locations for each of said interface units which is proportionate to the respective said levels of priority.

6. A system comprising:

a bus controller and a plurality of interface units having respective addresses, the interface units being connected to the bus controller by the bus, the bus controller including a memory for storing said addresses, and the bus including four separate functional parts each constituted by respectively physically separate wires or leads, including a control bus arranged for transmitting cell synchronization signals and bit synchronization signals from the bus controller to the interface units, an address bus for arranged identifying individual ones of said interface units at respective succeeding times, by writing respective addresses for said individual units from said memory onto said bus, a data bus arranged for transmitting ATM cells from the respective said interface units, one unit at a time, to said bus controller, by respective transmissions which are synchronized by said cell synchronization signals, which indicate the start of each new cell on said bus and for reception of ATM cells by respective ones of said interface units, and a request-to-send lead arranged for transmitting a respective a request-to-send message from each said interface unit, to said bus controller;

said memory being arranged to maintain maintaining said addresses in said memory in a predetermined order;

said bus controller being arranged to write said addresses from said memory onto said address bus in said predetermined order;

each said interface unit being arranged such that, when having at least one ATM cell to be transmitted, upon detecting its own address from said address bus as a result of that address being written onto said address bus by said bus controller, said interface unit transmits a respective request-to-send signal on said request-to-send lead, to said bus controller;

said bus controller being arranged to detect each said request-to-send signal, from said request-to-send lead, and, in response to receiving each said request-to-send signal, to temporarily maintain the respective said address on said address bus;

said bus controller being arranged to transmit said synchronization signal on said control bus;

each said interface unit, in response to receiving a rising edge of respective next cell synchronization signal on said control bus while its respective said address is being maintained on said address bus, being arranged to transmit the respective said at least one ATM cell on said data bus.

7. The system of claim 6, further comprising:

for transmitting multiplexed ATM cells from having respective address fields, from said bus controller to respective ones of said interface units, said bus controller being arranged to read identifiers of respective ones of said interface units from respective ones of said address fields; and said bus controller being arranged to place each of said identifiers in succession on said address bus and to place each respective cell being transmitted thereby, in respective succession on said data bus; and each of said interface units being arranged to receive only respective ones of said ATM cells transmitted by said bus controller.

8. The system of claim 6, wherein:

said bus controller is arranged to transmit said synchronization signals on said control bus as a succession of pulses having respective intervals between them; and said bus controller has an address space of said memory, access rate to said memory and cell transmission frequency on said data bus, such as to cause said bus controller to write successive ones of said addressed onto said address bus in respective successive ones of said intervals.

9. The system of claim 6, wherein:

said interface units, among them, have at least two different ATM cell transmitting rates; and said memory is provided with a respective number of memory locations for each of said interface units which is proportionate the respective ones of said rates.

10. The system of claim 6, wherein:

said interface units, among them, have at least two different priority levels; and said memory is provided with a respective number of memory locations for each of said interface units which is proportionate to the levels of priority.

11. A system for controlling a statistically multiplexed ATM bus, comprising:

an ATM bus having an address bus and a data bus;

a bus controller arranged for transmitting cells over said ATM bus;

a plurality of interface units connected to the controller by said ATM bus;

said bus controller being provided with a memory in which are stored addresses of said interface units such that, for each cell to be transmitted to said ATM bus by a respective said interface unit, the address of the respective said interface unit participating in the transmission can be read from the memory and set on said address bus of said ATM bus;

said bus controller being arranged to transmit ATM cells over said data bus of said ATM bus from said bus controller to only its respective ones of interface units and vice versa at such a rate that during the transmission of each such cell, said bus controller can fetch a respective next interface unit address for transmission of respective next such cell to said data bus; and said ATM bus further including a synchronization bus for transmitting cell sync pulses from said bus controller;

said bus controller having an address space for said memory a memory access rate, and said data bus having transmission frequency, which are proportioned to one another such that all of said address space is arranged to be scanned between each two successive ones of said cell sync pulses by conducting a poll that covers the addresses of all of said interface units.

* * * * *

UNITED STATES PATENT AND TRADEMARK OFFICE
CERTIFICATE OF CORRECTION

PATENT NO. : 5,841,774
DATED : November 24, 1998
INVENTOR(S) : FLINCK et al.

It is certified that error appears in the above-identified patent and that said Letters Patent is hereby corrected as shown below:

On the title page: Item [73]

Assignee: Nokia Telecommunication Oy, Espoo Finland

Should read

-- Assignee: Nokia Telecommunications Oy, Espoo Finland.--

Signed and Sealed this

Fourteenth Day of September, 1999

Attest:

Q. TODD DICKINSON

*Attesting Officer*     *Acting Commissioner of Patents and Trademarks*